United States Patent
Lu et al.

[11] Patent Number: 5,977,734
[45] Date of Patent: Nov. 2, 1999

[54] CIRCUIT AND METHOD FOR DETERMINING OPTIMAL PHASE COMBINATION FOR STARTUP OF A POLYPHASE DC MOTOR

[75] Inventors: Li-Hsin David Lu; Chinh Dac Nguyen, both of San Jose; Francis Yu, Sunnyvale, all of Calif.

[73] Assignee: STMicroelectronics, Inc., Carrollton, Tex.

[21] Appl. No.: 09/150,129

[22] Filed: Sep. 9, 1998

[51] Int. Cl.[6] .............................. H02P 7/00; H02R 39/46
[52] U.S. Cl. ........................... 318/439; 318/254; 318/138
[58] Field of Search .................................... 318/138, 245, 318/254, 433, 439, 771; 323/284, 907, 282, 283, 315; 360/78.04, 75

[56] References Cited

U.S. PATENT DOCUMENTS

| | | | |
|---|---|---|---|
| 4,633,358 | 12/1986 | Nagano | 361/31 |
| 5,237,262 | 8/1993 | Ashley et al. | 323/284 |
| 5,514,939 | 5/1996 | Schlager et al. | 318/254 |
| 5,589,744 | 12/1996 | Brambilla | 318/254 |
| 5,610,486 | 3/1997 | Li | 318/439 |
| 5,614,797 | 3/1997 | Carobolante | 318/432 |
| 5,656,897 | 8/1997 | Carobolante et al. | 318/254 |
| 5,656,910 | 8/1997 | Erckert | 318/685 |
| 5,661,383 | 8/1997 | Schlager et al. | 318/439 |
| 5,696,658 | 12/1997 | Pietrobon | 361/31 |
| 5,736,879 | 4/1998 | Pham | 327/102 |
| 5,796,276 | 8/1998 | Philips et al. | 328/108 |
| 5,796,545 | 8/1998 | Canclini | 360/78.04 |
| 5,867,001 | 2/1999 | Lagerquist et al. | 318/439 |

*Primary Examiner*—Paul Ip
*Attorney, Agent, or Firm*—Theodore E. Galanthay; Lisa K. Jorgenson

[57] ABSTRACT

A circuit for determining an initial winding combination for motor startup of a polyphase dc motor having a transistor driver circuit comprising a plurality of high side winding drivers and low side winding drivers operably connected to first and second voltage sources comprises a current mirror circuit and a plurality of sense FETs each operably connected between one of the voltage sources and the gate of one of the winding driver transistors in each phase combination. The sense FETs are operably connected to one side of the current mirror circuit. The mirror circuit compares the current through the sense FET with a current threshold provided on the other side of the current mirror and produces an output signal when the threshold is reached. At the same time, the time to reach the threshold is measured and the phase combination having the longest time is stored. Also when the threshold is reached, the sequencer advances to the next phase combination for measurement until all phase combination have been sequenced. The motor is then started with the phase combination having the longest time measurement energized first.

24 Claims, 2 Drawing Sheets

CIRCUIT AND METHOD FOR DETERMINING OPTIMAL PHASE COMBINATION FOR STARTUP OF A POLYPHASE DC MOTOR

BACKGROUND OF THE INVENTION

1. Field of the Invention

This invention relates generally to the field of polyphase DC motor control circuits, and more particularly to a circuit and method for determining the phase winding combination to energize in a motor such as a disk drive motor prior to startup of the motor.

2. Description of the Related Art

Polyphase dc motors are widely used in fixed disk drive applications in personal computers. Typically, such a drive utilizes a magnetic medium on a flat circular disk to store binary data on the disk. The disk is spun by the polyphase dc motor, commonly called a spindle motor, at a relatively constant speed. One or more magnetic heads supported on an actuator arm are selectively moved radially inwardly or outwardly over the surface of the spinning disk by an actuator voice coil motor to read and write data from and to selective locations on the disk. When power is removed from the spindle motor, for example, on power off of the personal computer or on a power failure, routines are automatically implemented to physically move the heads to a predetermined parked position on or off of a landing zone adjacent the data portion of the disk surface, and the rotation of the disks is stopped. When the drive is off, the position of the actuator arm and heads is thus known.

When power is again restored or the PC is turned on again, the disk drive spindle motor starts. It is desirable that the power consumed and time duration of disk drive startup be minimized. This may be desirable for several reasons, the predominant ones of which are that the user cannot access the drive until the disk is running at constant speed and power consumption should be minimized. However, in order to efficiently start the polyphase dc motor, the correct starting point, i.e. phase combination, for the sequence of winding energizations must be determined. This is typically done by passing a small current sequentially through each of the winding combinations in a predetermined sequence and measuring time it takes for the voltage developed across a common sensing resistor in series with each of the winding combinations to reach a predetermined value. A comparator is then used to determine which winding combination takes the longest time to reach the predetermined voltage value and thus senses the winding combination having the highest reluctance from intersecting the magnetic field generated by the stationary permanent magnet pole pieces of the rotor. Passing drive current through this particular winding combination will provide the most starting torque and therefore will be the optimum combination that should be first energized on motor startup.

Typical disk drive spin motor control systems and circuits are described in U.S. Pat. Nos. 5,294,877, 5,317,243, and 5,866,998, which are hereby incorporated herein by reference in their entirety. Hard disk drive spin motors are typically three phase dc motors which have three sets of stator windings, A, B, and C having sets of series coils connected in a Y configuration. The rotor is typically a four pole device. Electrical current is fed through two legs of the "Y" with the third leg left floating in a series of repetitive combinations to cause the rotor to rotate. A sequencer controls a power stage of transistor switches to connect the windings to the voltage sources in the proper order. The six combinations of winding connections are thus AH,BL; AH,CL; BH,CL; BH,AL; CH,AL; and CH,BL; where A, B, C, indicates the winding leg and the "H" and "L" indicates the high side driver transistor, typically a field effect transistor (FET) switch being turned on and the low side driver FET being turned on.

Voltage developed across an external sensing resistor is typically utilized to determine which winding combination to energize first on motor startup. This sensing resistor is typically in series with the low side driver FET. In order to accurately determine which winding combination for the sequencer to use, this resistor must be highly accurate and dependable. Consequently, the cost of this high precision, high reliability sense resistor is rather high. In addition, the sense resistor is typically separate and distinct from the driver IC chip. A separate comparator circuit is also required for implementing the voltage comparison. This conventional configuration is relatively expensive. Therefore there is a need for a more economical approach to sensing the position of the rotor for startup of polyphase dc motors. In addition, there is a need for a circuit which eliminates the need for a precision resistor and eliminates the need for a comparator circuit without loss of reliability and accuracy.

SUMMARY OF THE INVENTION

The present invention meets the above identified needs. The primary object of the invention is to provide a reliable, low cost circuit for sensing polyphase dc motor winding position in advance of motor startup in order to efficiently start up the motor.

Another object of the invention is to provide a polyphase motor control circuit which does not utilize precision resistors or a voltage comparator in order to sense rotor position prior to startup.

Another object of the invention is to provide a polyphase motor control circuit that utilizes a plurality of sense FETs and a current mirror to determine the appropriate phase sequence for motor startup.

A circuit for determining an initial winding combination for motor startup of a polyphase dc motor having a transistor driver circuit comprising a plurality of high side winding drivers and low side winding drivers operably connected to first and second voltage sources in accordance with the present invention comprises a current mirror circuit and a plurality of sense FETs each operably connected between one of the voltage sources and the gate of one of the winding driver transistors and operably connected to one side of the current mirror circuit. Preferably the sense FETs are connected to the control terminals of the low side drivers. The mirror circuit compares the current through the sense FET with a current threshold provided on the other side of the current mirror and produces an output signal when the threshold is reached. The low side driver transistor, preferably a field effect transistor (FET), and the sense FET, in one preferred embodiment, have their gates connected together and their sources connected to a common voltage source. The current mirror is connected to a voltage source, a timer and an winding incremental sequencer. The timer output is connected to a select register which is in turn connected to the winding sequencer.

The timer measures the time between initiation of current flow to a winding combination and occurrence of an output signal from the current mirror circuit which occurs when the sense FET current matches a predetermined threshold current supplied to the other side of the current mirror. The select register compares the elapsed time output from the timer to its presently stored time and phase combination and replaces the stored time and phase combination if the current elapsed time output from the timer exceeds the previously stored value. When all phase combinations have been sampled, the timer is disabled and the select register passes its currently stored phase combination to the sequencer as the winding combination to use for motor startup. Motor startup then proceeds in a conventional manner.

More particularly, when power is initially applied to the spindle motor, the timer enables the drivers and the increment sequencer enables a first combination of windings. This turns on one high side driver and one low side driver at the same time. When the low side driver FET is turned on, the timer begins counting and winding current begins to flow. A proportionally smaller current in the ratio 1:X flows through the sense FET to the current mirror circuit. When the sense FET current reaches the preset programmable current threshold, a signal is sent to the sequencer to advance to the next phase winding and stop the timer. The elapsed time is sent to the select register. The select register then compares the elapsed time with the previously stored time difference, if any, and overwrites the register if the elapsed time is longer and stores the sequence state for this longest time in the sequencer. At the same time, the sequencer advances to the next winding combination and the timing process repeats. After all six phase combinations have been tested in this manner, the sequence state stored in the select register is then used by the drive controller as the initial sequence state for startup of the spindle motor.

Other objects, features and advantages of the present invention will become apparent from a reading of the following detailed description when taken in conjunction with the accompanying drawing wherein a particular embodiment of the invention is disclosed as an illustrative example.

DETAILED DESCRIPTION OF THE INVENTION

In the following description, like numerals will be utilized for like components wherever possible. Three preferred embodiments are described in detail. It is to be understood that other embodiments are envisioned as within the scope of the invention. For example, the circuit herein described may be utilized in any form of a polyphase motor, e.g., sinusoidal controlled, pulse width controlled, etc. and also is not limited to use in disk drive spin motors. In addition, transistor devices of either N or P type described and shown may be implemented with the other transistor type so long as voltage and current sources and semiconductor type is consistently and appropriately maintained.

First Embodiment

Figure 1:
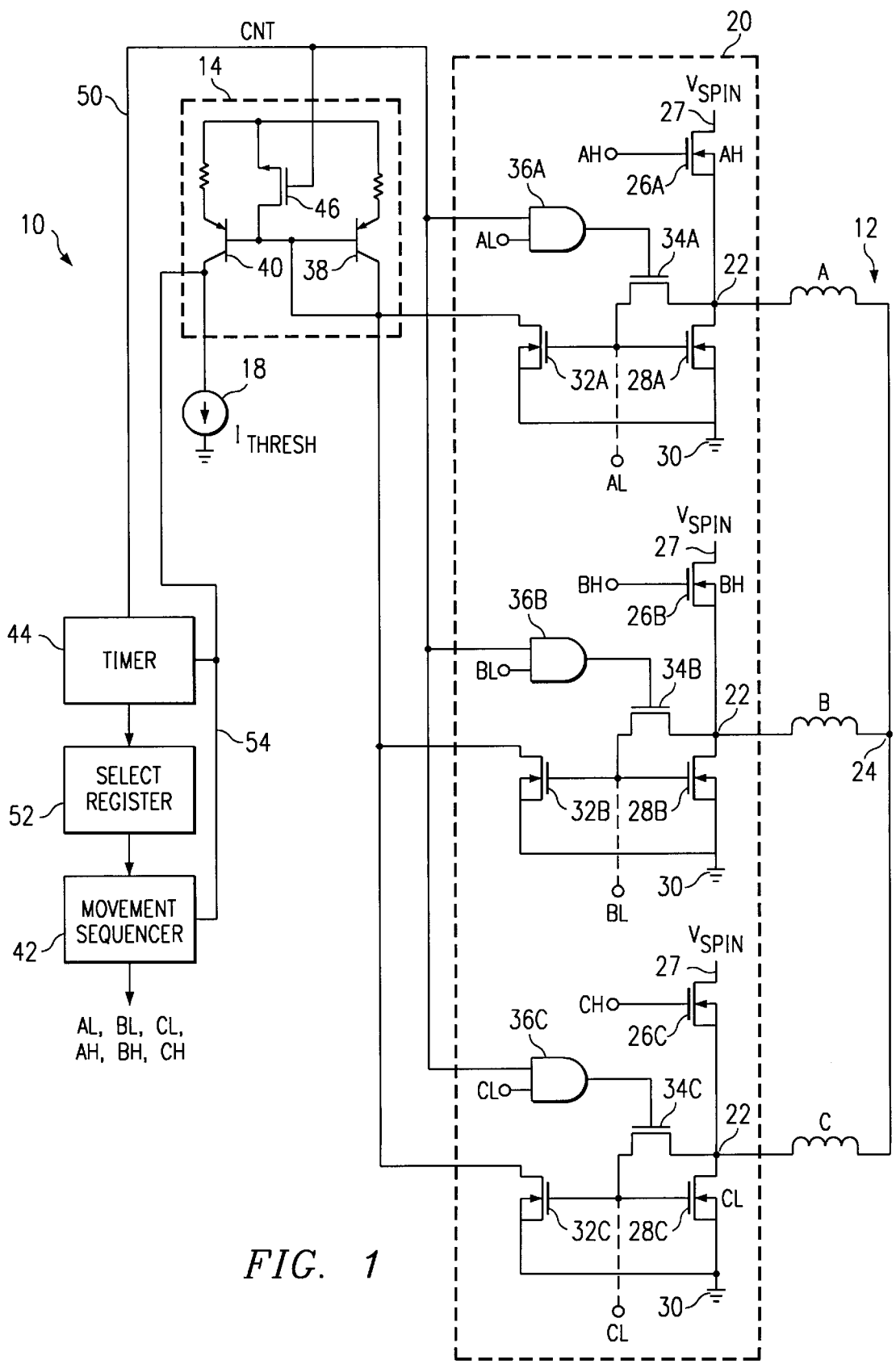
FIG. 1 is a schematic of a three phase dc disk drive motor power circuit in accordance with one embodiment of the invention.

A simplified diagram of a disk drive motor power circuit 10 in accordance with a first embodiment of the invention is shown in FIG. 1. The circuit 10 drives a "Y" connected three phase dc motor stator 12 and has a mirror circuit 14 connected to a timer 44, to a current threshold 18 and to a three phase driver circuit 20.

The driver circuit 20 is composed of three essentially identical phase drivers 20A, 20B, and 20C, each one connected to one end 22 of each winding A, B, or C. The other end of each winding A, B and C is joined together at node 24. The following description is for the driver circuit connected to winding A and applies equally to each of the three transistor driver circuits shown. Each driver circuit has a high side driver FET 26 which has its drain terminal connected to a voltage supply 27 (Vspin) and its source terminal connected to a free end 22 of one of the windings A, B, or C, in this case, winding A. The gate of the driver 26 is connected to the sequencer 42 in a conventional manner.

The driver circuit 20 also has a low side driver FET 28 having its source terminal connected to a common voltage reference 30 and its drain terminal connected to the winding end 22 and thus to the source terminal of the high side driver FET 26. The control or gate terminal of the low side driver FET 28 is connected to the control or gate terminal of a sense FET 32 and to the source terminal of a measuring switch FET 34. The gate terminal of the low side driver FET 28 is also connected to the sequencer 42, as indicated by the dashed line, in a conventional manner.

The source of the sense FET 32 is connected to the common reference 30. The drain of the sense FET 32 is connected to the collector of a bipolar transistor 38 in the mirror circuit 14 and to the drain of the other two sense FETs 32.

The measuring switch FET 34 has its source connected to the gates of the low side driver FET 28 and its sense FET 32. The measuring switch FET 34 drain is connected to the drain of the low side driver FET 28 and thus the one end 22 of the winding A, B, or C. The gate of the measuring switch FET 34 is connected to the output of an AND gate 36. The purpose of the measuring switch FET 34 is to turn the low side driver FET 28 into essentially a diode when the switch FET 34 is turned on. When the measuring switch FET 34 conducts, it shorts the gate and drain of the low side driver 28, effectively making driver FET 28 a diode.

The current mirror circuit 14 preferably comprises a pair of bipolar transistors 38 and 40. The collector of transistor 38 is connected to the drains of each of the sense FET 32. The emitters of transistors 38 and 40 are connected through series resistors to a voltage source V which may be any appropriate supply value such as 12, 5, or 3 volts, depending on the particular application. The collector of the other transistor 40 is connected to a programmable current threshold 18 and to an increment sequencer 42 and a timer 44. The drain of a PMOS transistor switch 46 is also connected to the bases of the transistors 38 and 40. The gate of the PMOS transistor 46 is connected to an inductive control line 50 which is in turn connected to the timer 44 and to one side of each of the AND gates 36A, B, C.

During normal motor operation, control line 50 is low. Therefore the AND gates 36 are disabled. A phase output combination from the sequencer 42 is fed to the gates of transistors 26 and 28 in a conventional manner to maintain motor rotation. However, prior to motor startup, the exact position of the motor rotor is not known. Therefore, upon receipt of a motor start signal, the control line 50 is turned on or made high for one complete sequence of phase energizations. When this happens, an enable signal is fed to each of the AND gates 36A, B, and C. Simultaneously, the timer 44 begins counting and sends a signal through the select register 52 to the sequencer 42, which issues a "1" to the high side driver and the AND gate for the low side driver, i.e. one of the winding combinations such as AL,BH. Thus, in this example, the AND gate, 36A turns on. This causes Measuring FET 34A to conduct, shorting the gate and drain of low side driver FET 28A. This in turn causes low side driver FET 28A to act as a diode. The control for high side driver FET 26B goes high causing FET 26B to turn on, forming a current path from Vspin, through high side driver 26B, through winding B to node 24 and through winding A, through low side driver 28A to ground or common 30. As current builds up through this path between two voltage sources, i.e. common 30 and Vspin 27 caused by the reluctance generated from the adjacent rotor pole s permanent magnetic flux, current also flows through sense FET 32A to the collector of transistor 38 in the mirror circuit. The amount of current flowing through the sense FET 32A is proportional to the current through the low side driver FET 28A according to the size ratio between these FETs.

Preferably the sense FET current is very low compared to the drive current. The size, or gain ratio of FET 32 to FET 28 is 1/x where 100<x<5000 and the ratio is preferably about 2000. Thus, for example, for a driver current of 20 milliamps, if the ratio is 1/2000, or 0.0005, the sense FET current will be 10 microamps. Thus the power used in determining the proper phase sequencing is very small.

The sense FET current feeds into the collector of transistor 38, which is one side of the mirror circuit 14. A threshold current 18 is sensed on the other side of this circuit. When the sense current matches the current threshold, an increment output high signal is sent on line 54 to the timer 44 to stop counting and to the sequencer 42 to increment the sequencer to the next phase combination. When the timer 44 is stopped by receipt of this signal, the timer 44 sends the accumulated time value in the timer to the select register 52 if the accumulated time value is greater than the resident contents of the select register 52.

At the same time, the sequencer advances to the next phase winding combination, for example AH,CL and the process just described repeats, as follows. Now the high side FET 26A control goes high, causing FET 26A to conduct, and AND gate 36C receives a high and turns on. This in turn causes measuring FET 34C to conduct, shorting the gate and drain of low side driver FET 28C. This in turn causes the low side driver FET 28C to act as a diode. The control for high side driver FET 26A goes high causing FET 26A to turn on, forming a current path from Vspin through high side driver 26A, through winding A to node 24 and through winding C, through low side driver 28C to ground or common 30. As current builds up through this path because of the reluctance due to the adjacent permanent magnet flux, current also flows through sense FET 32C to the collector of transistor 38. The amount of current flowing through the sense FET 32C is proportional to the current through the low side driver FET 28C according to the size ratio between these FETs. When the sense current matches the current threshold, an increment signal is sent on line 54 to the timer 44 to stop counting and to the sequencer 42 to again increment the sequencer 42 to the next phase combination. When the timer 44 is stopped, the timer 44 sends the accumulated time value to the select register 52 if the accumulated time value is greater than the current contents of the select register 52.

Once the prestart phase selection process has gone through the six phase combinations, the control line 50 goes low, effectively removing the sense FETs 32 and the current mirror 14 from the power circuit 20 and the increment sequencer 42 begins sequencing for motor startup using the phase combination last resident in the register 52 as the starting combination.

Second Embodiment

Figure 2:
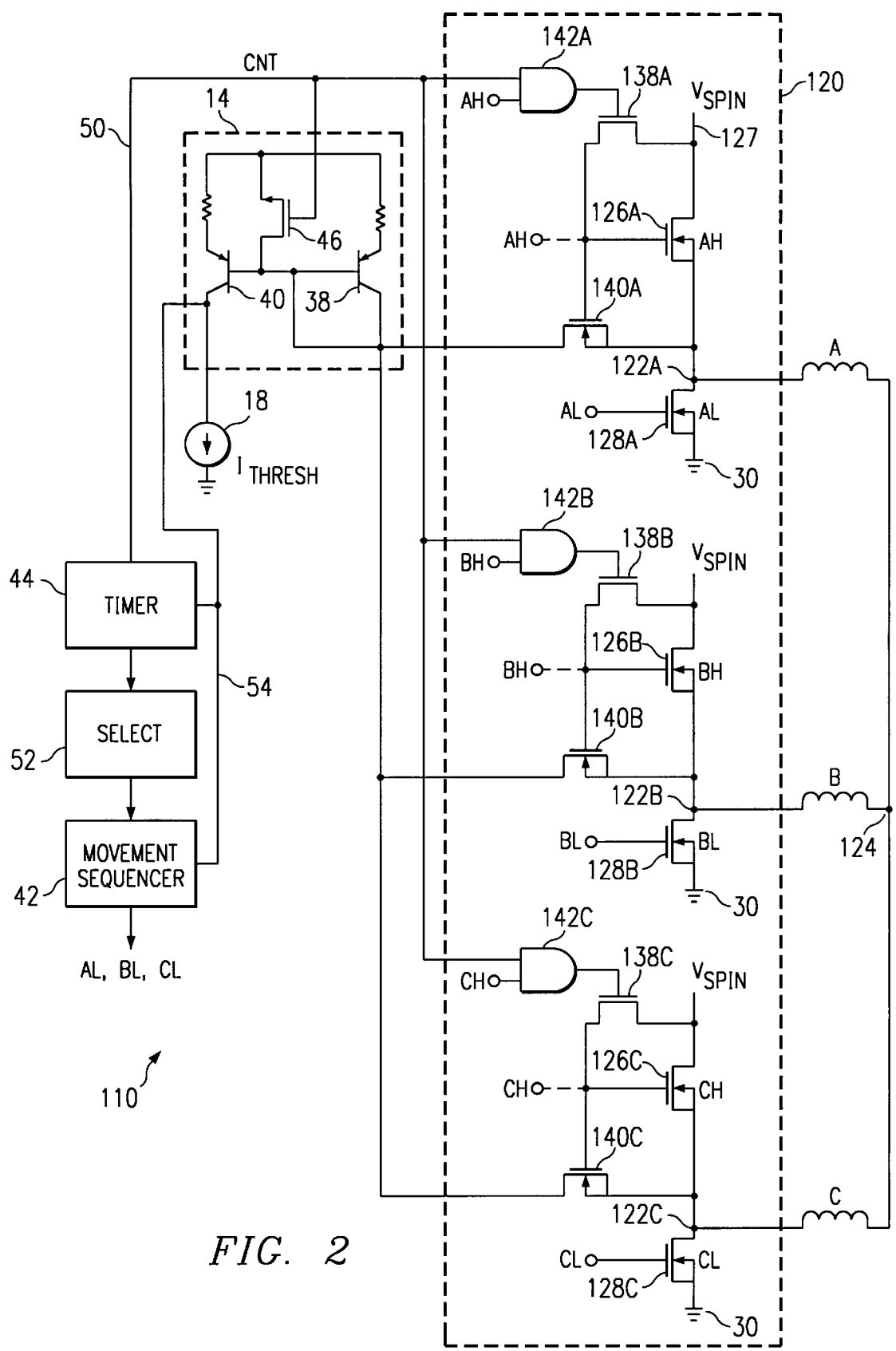
FIG. 2 is a schematic of a three phase dc disk drive motor power circuit in accordance with a second embodiment of the invention.

Referring now to FIG. 2, a second embodiment of the circuit in accordance with the present invention is shown. The circuit 110 drives a "Y" connected three phase dc motor stator 12 and has a mirror circuit 14 connected to a timer 44, to a current threshold 18 and to a three phase driver circuit 120.

The driver circuit 120 is composed of three essentially identical phase drivers 120A, 120B, and 120C, each one connected to one end 122 of each winding A, B, or C. The other end of each winding A, B and C is joined together at node 124. The following description is for the driver circuit 120A connected to winding A and applies equally to each of the other two transistor driver circuits shown. Each driver circuit has a high side driver FET 126 which has its drain terminal connected to a voltage supply 127 (Vspin) and its source terminal connected to a free end 122 of one of the windings A, B, or C, in this case, winding A. The control or gate terminal of the high side driver FET 126 is also connected to the control or gate terminal of a sense FET 140A and to the source terminal of a measuring switch FET 138A. The gate of the high side driver 126A is connected to the sequencer 42 during normal motor run operation in a conventional manner as indicated by the dashed line AH. The source of the sense FET 140A is connected to the free end 122A of winding A and thus the source of the high side driver 126A. The drain of the sense FET 140A is connected to the collector of a bipolar transistor 38 in the mirror circuit 14 and to the drain of the other two sense FETs 140.

The driver circuit 120A also has a low side driver FET 128A having its source terminal connected to a common voltage reference 30 and its drain terminal connected to the winding end 122A and thus to the source terminal of the high side driver FET 126A. The gate terminal of the low side driver FET 128A is connected to the sequencer 42.

The measuring switch FET 138A has its source connected to the gates of the high side driver FET 126A and its sense FET 140A. The measuring switch FET 138A drain is connected to the drain of the high side driver FET 126A and thus to Vspin 127. The gate of the measuring switch FET 138A is connected to the output of an AND gate 142A. The purpose of the measuring switch FET 138A is to turn the high side driver FET 126A into essentially a diode when the switch FET 138A is turned on during inductive sensing. When the measuring switch FET 138A conducts, it shorts the gate and drain of the high side driver 126A, effectively making driver FET 126A a diode.

The current mirror circuit 14 is the same as above described with reference to the first embodiment and preferably comprises a pair of bipolar transistors 38 and 40. The collector of transistor 38 is connected to the drains of each of the driver circuits 120. The emitters of transistors 38 and 40 are connected through series resistors to a voltage source V which may be any appropriate supply value higher than Vspin. The collector of the other transistor 40 is connected to a programmable current threshold 18 and to an increment sequencer 42 and a timer 44. The drain of a PMOS transistor switch 46 is also connected to the bases of the transistors 38 and 40. The gate of the PMOS transistor 46 is connected to an inductive control line 50 which is in turn connected to the timer 44 and to one side of each of the AND gates 142A, B, C.

During normal motor operation, control line 50 is low, and thus the AND gates 142 outputs are low and thus measuring switches 138 are non-functional. Again, prior to motor startup, the exact position of the motor rotor is not known. Therefore, upon receipt of a motor start signal, the control line 50 is turned on or made high. When this happens, an enable signal is fed to each of the AND gates 142A, B, and C. Simultaneously, the timer 44 begins counting and sends a signal through the select register 52 to the sequencer 42, which issues a "1" to one of the low side drivers 128 and the AND gate 142 for one of the high side drivers, i.e. one of the winding combinations such as AL,BH. Thus in this example winding combination, the AND gate, 142B turns on. This causes Measuring FET 138B to conduct, shorting the gate and drain of high side driver FET 126B. This in turn causes the high side driver FET 126B to act as a diode. The control for low side driver FET 128A goes high causing FET 128B to turn on, forming a current path from Vspin, through high side driver 126A, through winding B to node 124 and through winding A, through low side driver 128A to ground or common 30. As current builds up through this path between the two voltage sources, i.e. common 30 and Vspin 127 caused by the reluctance generated from the adjacent rotor pole s permanent magnetic flux, current also flows through sense FET 140B to the collector of transistor 38 in the mirror circuit 14. The amount of current flowing through the sense FET 140B is proportional to the current through the high side driver FET 126B according to the size ratio between these FETs.

Preferably the sense FET current is very low compared to the drive current. The size, or gain ratio of FET 140 to FET 126 is 1/x where 100<x<5000 and the ratio is preferably about 2000. Thus, for example, for a driver current of 20 milliamps, if the ratio is 1/2000, or 0.0005, the sense FET current will be 10 microamps. Thus the power used in determining the proper phase sequencing is very small.

The sense FET current feeds into the collector of transistor 38, one side of the mirror circuit 14 as previously described with reference to the first embodiment. A threshold current 18 is sensed on the other side of this circuit. When the sense current matches the current threshold, an increment output high signal is sent on line 54 to the timer 44 to stop counting and to the sequencer to increment the sequencer to the next phase combination. When the timer 44 is stopped by receipt of this signal, the timer 44 sends the accumulated time value in the timer to the select register 52 if the accumulated time value is greater than the resident contents of the select register 52.

At the same time, the sequencer advances to the next phase winding combination, for example AH,CL and the process just described repeats for this combination, as follows. Now the low side FET 128C control goes high, causing FET 128C to conduct. The AND gate 142A turns on since the AND gate is enabled, causing the measuring FET 138A to conduct, shorting the gate and drain of high side driver FET 126A. This in turn causes the high side driver FET 126A to act as a diode. This forms a current path from Vspin through high side driver 126A, through winding A to node 124 and through winding C, through low side driver 128C to ground or common 30. As current builds up through this path because of the reluctance due to the adjacent permanent magnet flux, current also flows through sense FET 140A to the collector of transistor 38. The amount of current flowing through the sense FET 140A is proportional to the current through the high side driver FET 126A according to the size ratio between these FETs. When the sense current matches the current threshold, an increment signal is sent on line 54 to the timer 44 to stop counting and to the sequencer 42 to again increment the sequencer 42 to the next phase combination. When the timer 44 is stopped, the timer 44 sends the accumulated time value to the select register 52 if the accumulated time value is greater than the current contents of the select register 52.

Once the prestart phase selection process has gone through all of the six phase combinations, the control line 50 goes low, effectively removing the sense FETs 140 and the current mirror 14 from the power circuit 120 and the increment sequencer 42 begins sequencing for motor startup using the phase combination last resident in the register 52 as the starting combination.

The present invention may be practiced otherwise than as specifically described above. Many changes, alternatives, variations, and equivalents to the various structures shown and described will be apparent to one skilled in the art. For example, the sense FETs need not be all on low or high side drivers. They may be mixed. NMOS and PMOS devices may be substituted in a manner well known in the art. Accordingly, the present invention is not intended to be limited to the particular embodiments illustrated but is intended to cover all such alternatives, modifications, and equivalents as may be included within the spirit and broad scope of the invention as defined by the following claims. All patents, patent applications, and printed publications referred to herein are hereby incorporated by reference in their entirety.

What is claimed is:

1. A circuit for driving a polyphase dc motor having a plurality of stator windings, said circuit selectively forming a current path through the windings between first and second voltage sources, said circuit comprising:

a plurality of high side drivers each connected to one of said windings and to said first voltage source for selectively forming a current path between said one winding and said first voltage source;

a plurality of low side drivers each connected to one of said windings and to said second voltage source for selectively forming a current path between said another one of said windings and said second voltage source;

a plurality of sense FETs each having a control connected to a control terminal of one of said drivers and having a terminal connected to said voltage source to which said one of said drivers is connected; and a current mirror circuit connected to a current threshold source and connected to each sense FET operable when said motor receives an initial start signal, wherein each sense FET is operable to pass a sense FET current therethrough to said current mirror circuit when said driver to which said sense FET is connected passes a current to one of said windings, said mirror circuit providing an output when said sense FET current reaches said threshold current source.

2. The circuit according to claim 1 further comprising a timer connected to said current mirror operable to sense time between said current passing through said sense FET and said current mirror providing said output.

3. The circuit according to claim 2 further comprising a sequencer connected to said timer, said current mirror circuit and to each of said drivers for selectively turning on one of said high side drivers and one of said low side drivers in phase combinations in accordance with a predetermined order.

4. The circuit according to claim 3 wherein each of said drivers connected to said sense PETs includes a transistor connected between said driver control terminal and said winding to which said driver is connected operable to short said driver control terminal to said winding upon receipt of a control input from said sequencer.

5. The circuit according to claim 4 further comprising a select register connected between said timer and said sequencer, said registerstoring an output from said timer and comparing a time output from said timer to a previously stored value and storing said time output and a corresponding winding combination if said timer output is greater than said previously stored time value.

6. The circuit according to claim 1 wherein said threshold current source is programmable.

7. The circuit according to claim 6 further comprising a timer connected to said current mirror operable to sense time between said current passing through said sense FET and said current mirror providing said output.

8. The circuit according to claim 7 further comprising a sequencer connected to said timer, said current mirror circuit and to each of said drivers for selectively turning on one of said high side drivers and one of said low side drivers in phase combinations in accordance with a predetermined order.

9. The circuit according to claim 8 wherein each of said drivers connected to said sense FETs includes a transistor connected between said driver control terminal and said winding to which said driver is connected operable to short said driver control terminal to said winding upon receipt of a control input from said sequencer.

10. The circuit according to claim 9 further comprising a select register connected between said timer and said sequencer, said register storing an output from said timer and comparing a time output from said timer to a previously stored value and storing said time output and a corresponding winding combination if said timer output is greater than said previously stored time value.

11. The circuit according to claim 1 wherein each driver receives a control input from a sequencer.

12. A circuit for determining a startup sequence for a polyphase dc motor having a plurality of stator windings selectively connectable to a drive current path through at least two of the windings between first and second voltage sources, said drive current path including a plurality of high side drivers each having a control terminal and each high side driver is connected to one of said windings and to said first voltage source for selectively forming a current path between said one winding and said first voltage source, a plurality of low side drivers each having a control terminal and each driver being connected to another one of said windings and to said second voltage source selectively forming a current path between said another one of said windings and said second voltage source, a sequencer connected to each of said control terminals of said drivers, said sequencer providing a signal to said driver control terminals to turn on said drivers in predetermined combinations, said circuit comprising:
  a plurality of sense FETs each connected to one of said voltage sources and having a control gate connected to said control of one of said drivers, each sense FET being operable to conduct a sense FET current therethrough representative of current passing through said one driver when said one driver is conducting current through one of said windings in said current path; and
  a current mirror circuit connected to a current threshold source and connected to each of said sense FETs, said mirror circuit receiving said sense current and providing an output to said sequencer when said sense current passing through one of said sense FETs exceeds a threshold current to enable said sequencer to change to a next predetermined combination.

13. The circuit according to claim 12 further comprising a timer connected to said mirror circuit for determining the time for a sense current to reach said threshold current.

14. The circuit according to claim 12 wherein said threshold current is programmable.

15. The circuit according to claim 13 further comprising a select register connected to said timer for storing a largest time received from said timer.

16. The circuit according to claim 15 wherein said select register stores a winding combination corresponding to said largest time and provides said winding combination to said sequencer.

17. A circuit for determining a startup sequence for a polyphase dc motor having a plurality of stator windings selectively connectable to a drive current path through at least two of the windings between first and second voltage sources, said drive current path including a plurality of high side drivers each having a control terminal and each high side driver is connected to one of said windings and to said first voltage source for selectively forming a current path between said one winding and said first voltage source, a plurality of low side drivers each having a control terminal and each driver being connected to another one of said windings and to said second voltage source selectively forming a current path between said another one of said windings and said second voltage source, a sequencer connected to each of said control terminals of said drivers, said sequencer providing a signal to said driver control terminals to turn on said drivers in predetermined combinations, said circuit comprising:
  a plurality of sense FETs each connected to said second voltage source and having a control gate connected to said control of one of said low side drivers, each sense FET being operable to conduct a sense FET current therethrough representative of current passing through said one low side driver when said low side driver is conducting current through one of said windings in said current path; and
  a current mirror circuit connected to a current threshold source and connected to each of said sense FETs, said mirror circuit receiving said sense current and providing an output to said sequencer when said sense current passing through one of said sense FETs exceeds a threshold current to enable said sequencer to change to a next predetermined combination.

18. The circuit according to claim 17 further comprising a timer connected to said mirror circuit for determining the time for a sense current to reach said threshold current.

19. The circuit according to claim 18 wherein said threshold current is programmable.

20. The circuit according to claim 19 further comprising a select register connected to said timer for storing a largest time received from said timer.

21. The circuit according to claim 20 wherein said select register stores a winding combination responsible for said largest time and provides said winding combination to said sequencer.

22. A method for determining a starting combination for sequencing a polyphase dc motor having a plurality of phase windings, a plurality of high side drivers each connected to one of said windings and to a first voltage source for selectively forming a current path between said one winding and said first voltage source, a plurality of low side drivers each connected to one of said windings and to a second voltage source for selectively forming a current path between said one winding and said first voltage source, and a sequencer operably connected to each of said drivers for sequentially selectively turning on said high side and said low side drivers to form said current path between said voltage sources through a plurality of predetermined combinations of said windings, said method comprising the steps of;

connecting one terminal of a plurality of sense FETs to one side of a current mirror circuit, another terminal of each of said plurality of sense FETs to one of said voltage sources and a control terminal of each sense FET to a control terminal of one of said drivers connected to said one of said voltage sources;

applying a current threshold to another side of said current mirror circuit;

turning on each predetermined combination of said high and low side drivers for said windings in a predetermined sequence;

generating a sensing current in at least one of said sense FETs representative of current flowing through each combination of said windings;

measuring and storing a threshold time for said sensing current in each driver combination to reach said predetermined current threshold;

comparing each threshold time for each driver combination to determine the combination having a longest threshold time; and selecting the combination of drivers having the longest threshold time as the starting driver combination for motor startup.

23. The method according to claim 22 wherein said step of turning on comprises shorting said control terminal of said driver in said combination having a sense FET connected thereto to the terminal of said driver connected to said winding to turn on said driver.

24. The method according to claim 23 wherein said sense FETs are connected to low side drivers.

* * * * *